United States Patent [19]
Barthel et al.

[11] Patent Number: 5,394,409
[45] Date of Patent: Feb. 28, 1995

[54] METHOD OF DETECTING AND LOCALIZING ERRORS IN REDUNDANT PRIMARY DETECTORS OF AN AUTOMATION SYSTEM

[75] Inventors: Herbert Barthel, Herzogenaurach; Jochen Höhn, Leopoldshafen, both of Germany

[73] Assignee: Siemens Aktiengesellschaft, Munich, Germany

[21] Appl. No.: 918,336

[22] Filed: Jul. 21, 1992

[30] Foreign Application Priority Data

Jul. 22, 1991 [EP] European Pat. Off. .......... 91112257

[51] Int. Cl.$^6$ ............................................ G06F 11/30
[52] U.S. Cl. ...................... 371/62; 371/16.3; 371/36
[58] Field of Search ................. 371/62, 57.1, 67.1, 371/16.3, 36; 340/527, 523, 587

[56] References Cited

U.S. PATENT DOCUMENTS

| | | | |
|---|---|---|---|
| 4,594,714 | 6/1986 | Fischer et al. | 371/62 |
| 4,808,972 | 2/1989 | Nicholls | 340/541 |
| 4,810,998 | 3/1989 | Hwang | 340/541 |

Primary Examiner—Vincent P. Canney
Attorney, Agent, or Firm—Kenyon & Kenyon

[57] ABSTRACT

In redundant primary detectors, the accrual of a waiting time (T) is triggered when the value of the detector signals differ. When the detector signals still differ after the expiration of the waiting time (T), either the detector whose signal has not changed is registered as defective, or, it is decided on the basis of a majority based decision of at least three detectors which of the detectors is defective.

19 Claims, 2 Drawing Sheets

METHOD OF DETECTING AND LOCALIZING ERRORS IN REDUNDANT PRIMARY DETECTORS OF AN AUTOMATION SYSTEM

BACKGROUND OF THE INVENTION

The present invention relates to a method for detecting and localizing errors in redundant primary detectors of an automation system.

Until now, in redundant automation systems, only methods for detecting typical line defects occurring between primary detectors and the automation system (e.g., short-circuits or broken wires) were known. When such a defect was detected the signal from the detector with the defective line was ignored. Previously, no method existed for automatically detecting faults in the detectors themselves. Until now, if an installation was designed to be highly redundant or fault tolerant, the process to be controlled could still be incorrectly controlled if an undetected detector fault existed. This resulted in damages. Further, if the installation was designed to be highly reliable (i.e., fail safe), the installation could be shifted to a safety condition, such as a shut down condition, even when the technical process could have been controlled by another detector that was properly functioning. This resulted in production losses.

The present invention provides a solution to the shortcomings of the prior art. The present invention automatically detects not only line defects, but also detector errors and these errors can be localized with a high degree of probability.

SUMMARY OF THE INVENTION

The method of the present invention achieves the aforementioned solution with the following steps:

triggering the accrual of a waiting time incrementor when the values of the signals supplied by the detectors differ significantly;

outputting an error signal when the values of the signals supplied by the detectors differ considerably even after the expiration of the waiting time;

when doubly redundant primary detectors are used, determining the one detector whose signal has not changed its value, and registering this detector as defective;

when at least triply redundant primary detectors are used, determining the one detector which after the expiration of the waiting time supplies a signal which differs considerably from the signals supplied by the other detectors, and definitively registering this detector is as defective.

The present invention is based on the experimentally supported fact that the most frequent error by far in primary detectors is their getting stuck in a fixed state, i.e., the value of the signal supplied by the primary detector remains constant even when it should change.

When two redundant primary detectors are used, initially registering a defective detector as not yet definitively registered as defective is advantageous, since the other detector could also have changed its signal due to a malfunction. However, this is very improbable since, as mentioned above, most errors are due to detectors not changing the value of their signal. When the other detector changes its signal once more, before the detector registered as defective changes its signal, the detector registered as defective is advantageously now definitively registered as defective. Once a detector is definitely registered as defective, the signal supplied by this detector is ignored for the purposes of controlling the process until the detector is repaired or replaced.

On the other hand, if the first detector essentially adjusts its signal, in particular to the signal of the other detector after the waiting time expires, but before a renewed signal change by the other detector, the first detector is registered as functioning correctly and the other detector is definitively registered as defective. The availability and reliability of one system having at least three redundant detectors can be elevated to a maximum extent when, after the one detector is definitively registered as defective, the two other properly functioning detectors are monitored according to the following steps:

a) determining the values of the signals of the detectors;

b) comparing the determined values of the signals of the detectors;

c) initiating the accrual of a waiting time incrementor when the determined values of the signals supplied by the detectors differ by a predetermined value;

d) outputting an error signal when the determined values of the signals supplied by the detectors differ by said predetermined value after the waiting time incrementor has reached a predetermined limit;

e) if an error signal is output, determining which of the detectors did not have the value of, its signal changed; and f) registering the detector determined in step (e) as provisionally defective.

BRIEF DESCRIPTION OF THE DRAWINGS

Further advantages and details are revealed in the following description of an exemplified embodiment based on the drawings.

DETAILED DESCRIPTION

Figure 1:
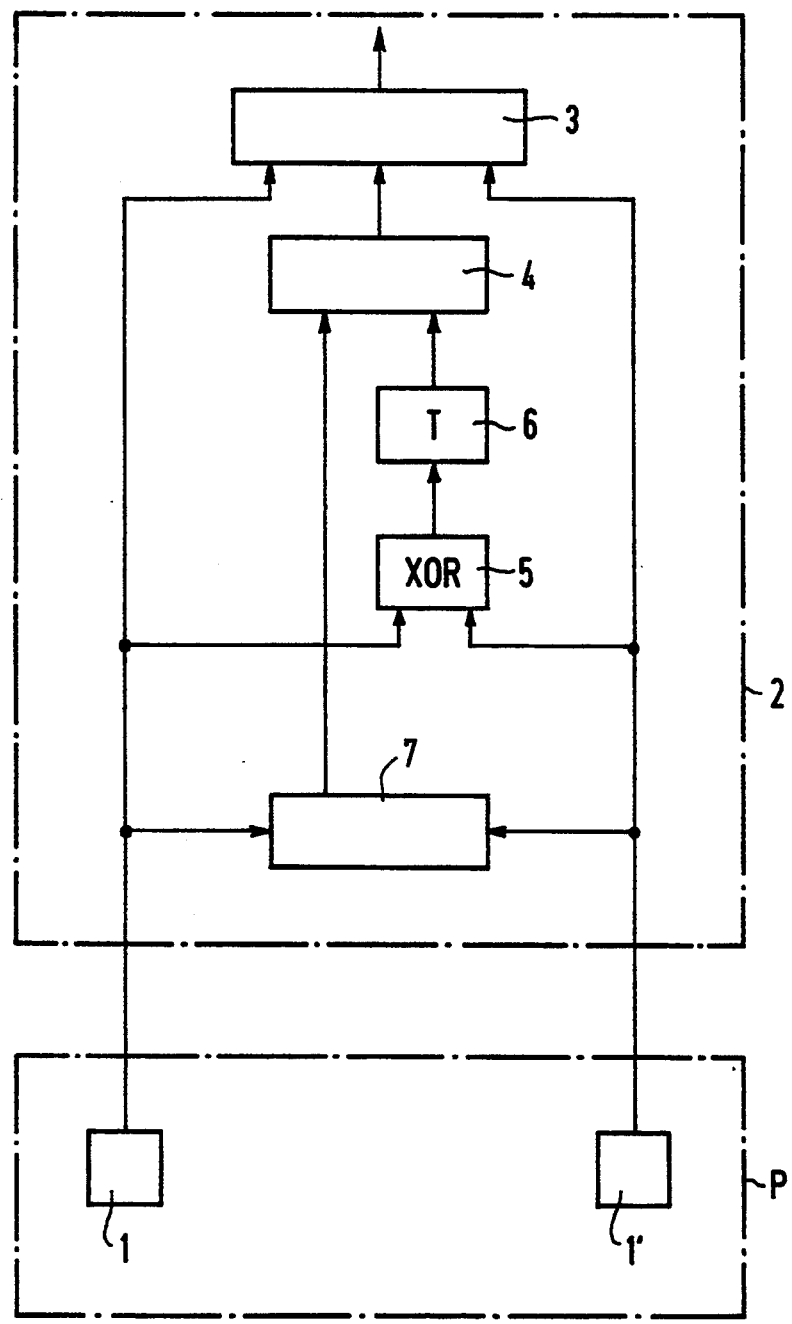
FIG. 1 depicts a block diagram for detecting and localizing primary detector errors in two redundant, digital primary detectors.

According to FIG. 1, two redundant, digital primary detectors 1, 1' send status signals about the process P to the automation system 2. When the status of the process P (a chemical process, for example a pharmaceutical chemistry or petrochemistry process) changes, the signals supplied by the primary detectors 1, 1' to the automation system 2 change. The signals are primarily transmitted to the evaluation circuit 3. Based on the signals supplied by the detectors 1, 1' and the signal supplied by the error detection circuit 4, the evaluation circuit 3 determines which of the signals supplied by the detectors 1, 1' takes precedence. The operation of the error detection circuit 4 shall be more fully described in the following.

Due to assembly tolerances and differences in propagation delay, as well as other less significant responsivity characteristics of the detectors 1, 1', when the status of the process P changes, the signals supplied by the detectors 1, 1' do not change simultaneously. In the following description, the detector 1 is assumed to change its signal before detector 1' does.

The signal change by the detector 1 is registered in the differential detector 5, which for example is an XOR element. When the differential detector 5 outputs a binary one for example, the waiting time T of the timing element 6 is initiated and begins accruing. When the waiting time T has expired (i.e., reaches a predetermined limit), a signal indicating this expiration of the waiting time T is transmitted to the error detection circuit 4. As a result, the error detection circuit 4 reads in the signal transmitted by the edge detector 7. This signal can have a value of either +1, −1, or 0. The value +1 is transmitted when the signal of the detector 1 has changed and that of the other detector 1' has not. The value −1 is transmitted when the signal of the detector 1' has changed and that of the detector 1 has not. The value 0 is transmitted when either the signal from the detector 1' has followed the signal from the detector 1 or the signal from the detector 1 has changed back.

In addition, the accrual of the waiting time T in the timing element 6 is initiated and begins accruing when a renewed inequality between the signals supplied by the detectors 1, 1' is detected. Thus, for example, when the signal from the detector 1' lags behind the signal from detector 1, or when the signal from the detector 1 is reset while the waiting time T is elapsing, the signal supplied by the edge detector 7 is affected while the waiting time T does not accrue. On the other hand, when a renewed change takes place while the waiting time T runs off, this time, for example, in the primary detector 1', the accrual of the waiting time T is triggered once again. When the waiting time T elapses without the detector 1 likewise changing its signal, or if the signal from the detector 1' was reset, then of course, the value −1 is transmitted by the edge detector 7 to the error detection circuit 4.

After the waiting time T expires, the error detection circuit 4 determines which value, namely again 0, +1 or −1, is transmitted to the evaluation circuit 3.

The value zero transmitted to the evaluation circuit 3 indicates that the signals supplied by the detectors 1, 1' are the same. However, depending on the application, while the waiting time is accruing but before it expires, for example, an immediate reaction to a change can exist, or the process can, in principle, be controlled according to the more critical signal, or there can be a reaction only after the response by the second detector.

The value +1 or −1 transmitted to the evaluation circuit 3 indicates that the signal supplied by the primary detector 1 or by the primary detector 1', respectively, always takes precedence. The signal from the other primary detector is ignored in each case.

When the modified signal is used as an actually valid signal, the more critical signal may be made available for further controlling the process P, before the waiting time T expires. If there is an immediate control reaction, the second detector sometimes may not respond. This lack of response may be mistakenly registered as an indication that the second detector is defective. In contrast, in a 2-out-of-2 evaluation, the control reaction is only introduced after the second detector responds, or rather after the waiting time T expires. Therefore, the second detector cannot be mistakenly registered as defective.

The error detection circuit 4 registers, whether one of the detectors 1, 1' is defective and if so, possibly which one. However, according to an advantageous refinement of the present invention, this registration is only provisional. After the waiting time T expires, if the signal from the detector first registered as defective changes again before the signal supplied by the other detector changes again, the detector initially registered as defective is assumed to function properly after all and the other detector is assumed to be defective. Therefore, the detector initially registered as defective is again registered as functioning properly and the other detector is registered as defective. However, this registration is now final.

When, on the other hand, the properly registered other detector changes its signal once again before the detector registered as defective changes its signal, the registration of the one detector as defective is now final.

Figure 2:
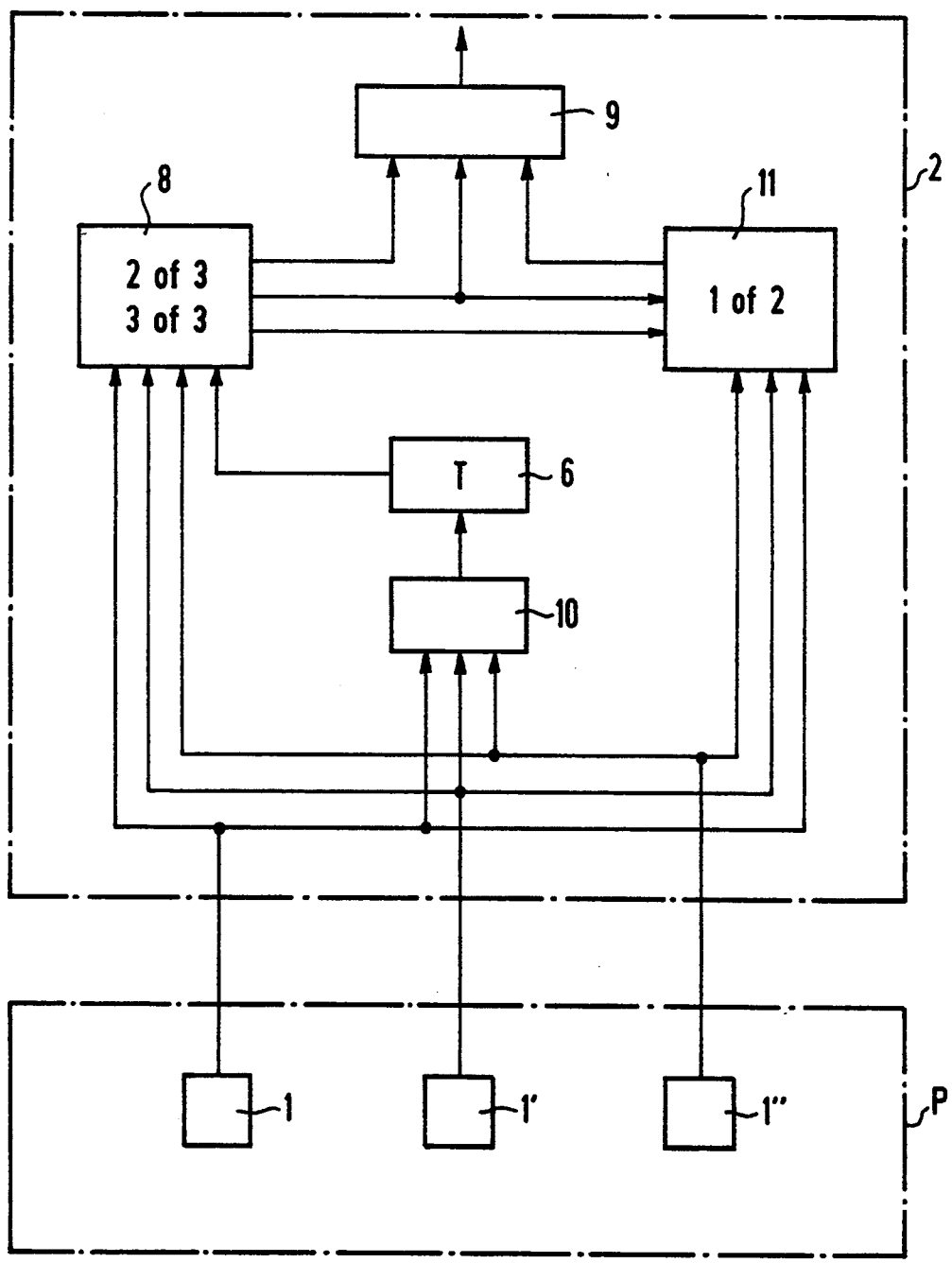
FIG. 2 depicts a block diagram for detecting and localizing primary detector errors in three redundant, digital primary detectors.

The method described above is altered slightly when at least a triple-redundant detector configuration is used. FIG. 2 illustrates the corresponding circuitry. The same reference numerals signify the same elements as described previously for FIG. 1.

The process P to be controlled is now monitored by redundant detectors 1, 1', and 1''. The three signals supplied by the detectors 1, 1', and 1'' are input into the evaluation circuit 8, which determines which signal is in fact valid based on a 2-out-of-3 or a 3-out-of-3 decision. This determination is transmitted to the retransmit circuit 9. Furthermore, each change in one of the input signals supplied by the detectors 1, 1', and 1'' is detected in the differential detector 10. When the signals supplied by the detectors 1, 1', and 1'' are not the same, the accrual of the waiting time T is triggered once again in the timing element 6.

When the waiting time T expires, a signal indicating this fact is provided to the evaluation circuit 8. If the signals supplied by the detectors, 1, 1', and 1'' are not the same at this instant, a majority based decision is made. In other words, the one detector which, after the expiration of the waiting time T, supplies a signal that differs from the signals supplied by the other detectors is determined. As a result, the evaluation circuit 8 is made inactive and a signal indicating this is provided to circuits 9 and 11. The detector 1, 1', or 1'' determined to be defective is also transmitted to the logic circuit 11. Based on the inactive status signal from the evaluation circuit 8, the retransmit circuit 9 immediately uses the signal supplied by the logic circuit 11 rather than the signal supplied by the evaluation circuit 8. The logic circuit 11 is activated by the inactive status signal from the evaluation circuit 8. In the logic circuit 11, the signals supplied by the two properly functioning detectors are processed according to the method described referring to FIG. 1.

Therefore, even two detectors 1, 1', 1'' can fail, one after the other, and the process is nevertheless reliably controlled.

When the actually valid signal is determined based on a 2-out-of-3 decision, the majority result for the continued control of the process P is prepared before the waiting time T expires. Then, if there is an immediate control reaction (i.e., a change before the waiting time T expires), the third detector might no longer respond. Therefore, the third detector may be mistakenly registered as defective because it is not responsive. On the other hand, in a 3-out-of-3 evaluation, the control reaction is introduced only after the third detector responds, or after the expiration of the waiting time T. In other words, one of the detectors cannot be mistakenly registered as defective.

The methods described above are, of course, not only applicable to digital detectors 1, 1', and 1", but are applicable to analog detectors as well. If analog detectors are to be used, the differential detectors 5, 10 must be designed to tolerate a slight signal deviation, (which is unavoidable with analog signals) without triggering the accrual of the waiting time T. As a rule, the tolerance threshold lies between 1 and 10% of the maximum permissible value, typically at 5%. Furthermore, the edge count of the signals supplied by the detectors is altered to such an extent that the signals are differentiated. Thus the rates of change of the signals supplied by the detectors are detected, and a change in a signal is recognized when the rate of change pertaining to this signal exceeds a preselectable value. When several signals simultaneously demonstrate a rate of change which exceeds this preselectable value, either all signals, which would normally be registered as changing, are registered as changed or, only the signal with the greatest rate of change in terms of absolute value is registered.

Advantageous refinements of the present invention are discussed in the following.

Processing only the signals which are pertinent to reliability or availability rather than redundantly processing all of the signals supplied by the process is advantageous since the costs for the automation system 2, the expenditure of time and energy to install the system 2, and the reaction time of the system 2 to altered process states are minimized.

When a detector is registered as defective, a status message should be provided to the user (for example in the form: "Detector 1 defective, if detector 1 functions correctly when checked manually, immediately check detector 1'").

When one employs a single detector, whose signal is supplied in identical form to several modules of the automation system 2, the modules can be tested during operation. Since, namely, the modules receive identical input signals, they should react in the same way. A malfunction is indicated if the modules react differently. The criteria for selecting the defective module are the same as for selecting a defective detector.

Line defects are also detected. Independent methods for detecting line defects are, therefore, no longer needed.

When control signals supplied by the automation system 2 to the process P are output to the process via redundant process signal converters and the output signals are fed back to the automation system 2 again, the process signal converters can be checked using a test similar to the one for the primary detectors described previously above. The word "primary detector" or "detector" in the sense of the present invention comprises, therefore, both detectors, which input signals from the process P into the automation system 2, as well as detectors, which output signals from the automation system 2 to the process P.

The automation system 2 advantageously comprises two redundant central units, whereby an expansion unit, which is only operational in conjunction with a central unit, is connected up to both central units. One of the detectors 1, 1', or 1" is connected up to each of the three units. By properly coupling and synchronizing the units to each other, the system can tolerate both a failure of one or two detectors, as well as the failure of one central unit, and of the expansion unit, without having to shut down the process P.

Typical applications for the present invention include, for example, assembly-line operation, as encountered, inter alia, in the automotive industry and at airports, building services automation, and process automation in the glass industry. In the glass industry, in particular, where very slow, thermal processes take place in part, it can be effective to parameterize the waiting time T, which amounts to at least 10 ms, in other application cases typically to 50 ms, to be as long as quite a few seconds, for example up to over 30 seconds.

What is claimed is:

1. A method of detecting and localizing errors in two redundant primary detectors, each of which provides a detection signal to an automation system, comprising the steps of:
   a) determining the values of the detection signals of the respective detectors;
   b) comparing the determined values of the detection signals;
   c) initiating the accrual of a waiting time incrementor when the determined values of the detection signals supplied by the detectors differ by more than a predetermined amount;
   d) outputting an error signal when the determined values of the signals supplied by the detectors differ by more than said predetermined amount after the waiting time incrementor has reached a predetermined limit;
   e) if an error signal is output, determining which of the detectors did not have the value of its detection signal changed;
   f) registering the detector determined in step (e) as provisionally defective; and
   g) definitively registering the detector registered as provisionally defective in step (f) as defective when the value of the detection signal of the other detector changes once again before the value of the detection signal of the detector registered as provisionally defective changes.

2. The method according to claim 1 wherein the waiting time incrementor is reset and the accrual of the waiting time incrementor is initiated each time a new difference in the values of the detection signals of the detectors greater than said predetermined amount is determined.

3. The method according to claim 2 further including the step of definitively registering the detector registered as provisionally defective in step (f) as defective when the value of the detection signal of the other detector changes once again before the value of the detection signal of the detector registered as provisionally defective changes.

4. The method according to claim 1 further including the step of registering the detector registered as provisionally defective in step (f) as functioning correctly and the other detector is definitively registered as defective if the value of the detection signal of the detector registered as provisionally defective in step (f) changes after the waiting time incrementor has reached the predetermined limit but before the value of the detection signal of the other detector changes again.

5. The method according to claim 2 further including the step of registering the detector registered as provisionally defective in step (f) as functioning correctly and the other detector is definitively registered as defective if the value of the detection signal of the detector registered as provisionally defective in step (f) changes after the waiting time incrementor has reached the predetermined limit but before the value of the detection signal of the other detector changes again.

6. The method according to claim 1 further including the step of registering the detector registered as provisionally defective in step (f) as functioning correctly and the other detector is definitively registered as defective if the value of the detection signal of the detector registered as provisionally defective in step (f) changes after the waiting time incrementor has reached the predetermined limit but before the value of the detection signal of the other detector changes again.

7. The method according to claim 3 further including the step of registering the detector registered as provisionally defective in step (f) as functioning correctly and the other detector is definitively registered as defective if the value of the detection signal of the detector registered as provisionally defective in step (f) changes after the waiting time incrementor has reached the predetermined limit but before the value of the detection signal of the other detector changes again.

8. The method according to claim 1 wherein the detection signals provided by the detectors are digital signals.

9. The method according to claim 8 wherein the step (a) of determining the values of the detection signals of the detectors is carried out by a means for detecting an edge such that changes in the value of the detection signals of the detectors can be determined.

10. The method according to claim 1 wherein the detection signals supplied by the detectors are analog signals.

11. The method according to claim 10 wherein the step (a) of determining the values of the detection signals of the detectors is carried out by a means for detecting when a rate of change of the detection signals exceeds a predetermined value.

12. A method for detecting and localizing errors in at least three redundant detectors which each provide a detection signal to an automation system comprising the steps of:
   a) determining the values of the detection signals of the respective detectors;
   b) comparing the determined values of the detection signals of the detectors;
   c) initiating the accrual of a waiting time incrementor when any of the determined values of the signals supplied by the detectors differ by more than a predetermined amount from any of the other values;
   d) after the waiting time incrementor reaches a predetermined limit, determining one detector having a detection signal value differing by more than said predetermined amount from the detection signal value of the other detectors;
   e) definitively registering said one detector as defective, wherein after a number of detectors become definitively registered as defective so that only two properly functioning detectors remain, the following steps are performed:
      a) determining the values of the detection signals of the respective detectors;
      b) comparing the determined values of the detection signals;
      c) initiating the accrual of a waking time incrementor when the determined values of the detection signals supplied by the detectors differ by more than said predetermined amount;
      d) outputting an error signal when the determined values of the detection signals supplied by the detectors differ by more than said predetermined amount after the waiting time incrementor has reached a predetermined limit;
      e) if an error signal is output, determining which of the detectors did not have the value of its detection signal changed; and
      f) registering the detector determined in step (e) as defective.

13. The method according to claim 12 wherein the waiting time incrementor is reset and the accrual of the waiting time incrementor is initiated each time a new significant difference in the values of the detection signals of the detectors is determined.

14. The method according to claim 13 wherein after a number of detectors become definitively registered as defective so that only two properly functioning detectors remain, the following steps are performed:
   a) determining the values of the detection signals of the detectors;
   b) comparing the determined values of the detection signals;
   c) initiating the accrual of a waiting time incrementor when the determined values of the detection signals supplied 'by the detectors differ by more than said predetermined amount;
   d) outputting an error signal when the determined values of the detection signals supplied by the detectors differ by more than said predetermined amount after the waiting time incrementor has reached a predetermined limit;
   e) if an error signal is output, determining which of the detectors did not have the value of its detection signal changed; and
   f) registering the detector determined in step (e) as defective.

15. The method according to claim 1 further comprising a step of: introducing a control reaction before the waiting time incrementor has reached the predetermined limit if value of the detection signals supplied by the detectors not registered as defective are equal.

16. The method according to claim 12 further comprising a step of:
   introducing a control reaction before the waiting time incrementor has reached the predetermined limit if value of the detection signals supplied by the detectors not registered as defective are equal.

17. The method according to claim 1 wherein the predetermined limit of the waiting time incrementor corresponds to a value in the range of 10 ms to 50 ms.

18. The method according to claim 12 wherein the predetermined limit of the waiting time incrementor corresponds to a value in the range of 10 ms to 50 ms.

19. A method of detecting and localizing errors in two redundant primary detectors, each of which provides a detection signal to an automation system, comprising the steps of:
   a) determining the values of the detection signals of the respective detectors;
   b) comparing the determined values of the detection signals;
   c) initiating the accrual of a waiting time incrementor when the determined values of the detection signals supplied by the detectors differ by more than a predetermined amount;
   d) outputting an error signal when the determined values of the signals supplied by the detectors differ by more than said predetermined amount after the waiting time incrementor has reached a predetermined limit;

e) if an error signal is output, determining which of the detectors did not have the value of its detection signal changed; and f) registering the detector determined in step (e) as provisionally defective; and g) registering the detector registered as provisionally defective in step (f) as functioning correctly and the other detector is definitively registered as defective if the value of the detection signal of the detector registered as provisionally defective in step (f) changes after the waiting time incrementor has reached the predetermined limit but before the value of the detection signal of the other detector changes again.

* * * * *